March 21, 1967  E. A. J. MARCATILI  3,310,358
CONICAL LENS FOCUSING MEANS FOR TM$_{on}$ MODES
Filed May 1, 1963  2 Sheets-Sheet 1

INVENTOR
E. A. J. MARCATILI
BY
Kenneth W. Mateer
ATTORNEY

March 21, 1967  E. A. J. MARCATILI  3,310,358
CONICAL LENS FOCUSING MEANS FOR TM$_{on}$ MODES
Filed May 1, 1963  2 Sheets-Sheet 2

United States Patent Office 3,310,358
Patented Mar. 21, 1967

3,310,358
CONICAL LENS FOCUSING MEANS FOR TM$_{on}$ MODES
Enrique A. J. Marcatili, Fair Haven, N.J., assignor to Bell Telephone Laboratories, Incorporated, New York, N.Y., a corporation of New York
Filed May 1, 1963, Ser. No. 277,267
8 Claims. (Cl. 350—189)

This invention relates to electromagnetic wave energy transmission systems and, more particularly, to focusing means for such energy in the TM$_{on}$ wave mode.

During the past several years there has been a constant expansion of the range of usable frequencies of electromagnetic wave energy available for the transmission of information from point to point. In general the trend has been toward higher and higher frequencies. The use of millimeter wavelength energy in the circular electric wave mode, for example, spawned many new wave guide components including the helix wave guide. In addition, hybrid junctions, mode filters, and mode converters all particularly adapted to circular electric mode propagation appeared in the art. More recently, the advent of continuously operable masers capable of generating coherent radiation at or near optical wavelengths, as described in an article appearing in Physical Review Letters, Feb. 1, 1961, at page 106, and entitled, "Population Inversion and Continuous Optical Maser Oscillations in a Gas Discharge Containing a He–Ne Mixture," by A. Javan, W. R. Bennett, Jr., and D. R. Herriott, has stimulated interest in the transmission of signal information on modulated electromagnetic radiation in the visible and infrared region of the spectrum. Solid state optical masers are now also well known.

The transmission of high frequency electromagnetic wave energy from point to point for communication purposes involves many varied problems, among which is beam focusing. As is well known, electromagnetic wave energy beams in the millimeter and optical frequency ranges experience physical spreading with propagation distance due to beam diffraction effects. Thus, periodic beam concentration, or focusing, is necessary if a desired maximum beam radius is to be maintained.

Likewise, since the energy propagates rectilinearly, redirection means for changing the energy propagation direction without destroying its mode configuration will be necessary in any communication system not only to follow non-linear rights-of-way and to effect convenient changes in propagation direction at repeater stations but also to effect simple city to city transmission due to the curvature of the earth.

As disclosed in my copending application Ser. No. 277,266, filed May 1, 1963, now Patent No. 3,283,262, optical masers can be stimulated to produce coherent wave energy in the TM$_{on}$, or circular magnetic, mode family by structuring the resonant cavities to contain at least one conical interface between the negative temperature medium and the associated reflectors. Optical masers operating in such a mode are typically more efficient than devices having conventional substantially planar interfaces. At millimeter wave frequencies, TM$_{on}$ mode generation can be effected by properly tapering a coaxial wave guide or by other mode conversion arrangements.

However, when modes of the circular magnetic family are employed as the propagation mode in communication apparatus, losses associated with conventional focusing and redirection means become undesirably high.

It is, therefore, an object of the present invention to focus with low attendant losses electromagnetic wave energy in TM$_{on}$ circular magnetic modes.

It is a further object of the invention to redirect circular magnetic mode wave energy with low attendant losses.

In accordance with the present invention, circular magnetic mode wave energy is focused by thin dielectric lenses which are hollow conical in shape. The inner lens surface is a simple conical surface and the external lens surface is tapered to provide focusing. The cone angle is proportioned such that an energy beam symmetrically illuminating the internal conical lens surface about its apex is incident everywhere at the Brewster angle, defined as $\tan^{-1} n$ where $n$ is the refractive index of the lens material. Interface reflections for the TM$_{on}$ modes are theoretically zero since the radial electric vectors are everywhere in the planes of incidence, defined at any point as the plane containing the normal to the lens surface and the axis of wave propagation.

One aspect of the invention involves its application to wave energy in both millimeter and optical frequency ranges. At millimeter wave frequencies the tolerances involved are less severe than at the higher optical frequencies. At optical frequencies, however, conical lenses are attractive from transmission loss considerations since the conical configuration imparts inherent mechanical rigidity, thereby permitting extremely thin lens walls. Accordingly, the losses in the lens body can be reduced to the low levels desirable in optical communication arrangements. Such loss levels have heretofore been of little practical interest.

The above and other objects of the invention, together with its various advantages and features, will become more readily apparent upon consideration of the accompanying drawings and the detailed description thereof which follows.

Figure 1:
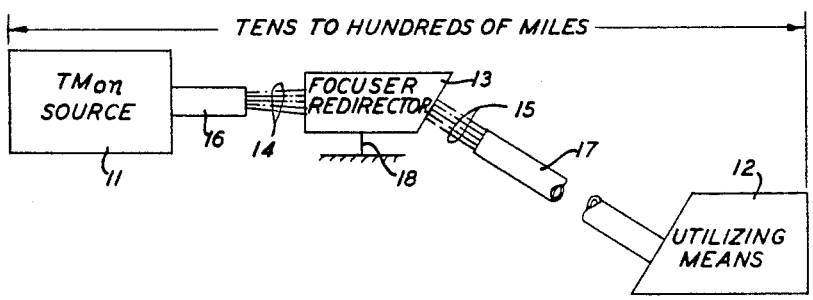
FIG. 1 is a diagrammatic representation of a communication system employing coherent wave energy in the millimeter or optical frequency range.

Referring more particularly to FIG. 1, an energy beam communication system is illustrated in which station 11 is a TM$_{on}$ mode source such as a transmitter or repeater and station 12 is a utilizing means such as a receiver or subsequent repeater. In any event the typical distance between stations 11, 12 is of the order of tens to hundreds of miles. Since such long distances are involved, and since it is known that diffraction effects cause the energy beam to spread, it is necessary periodically to refocus the energy. In addition, it is periodically necessary to alter the beam direction, if not because of natural obstructions or right-of-way considerations, then because of the curvature of the earth. Therefore, interposed between stations 11, 12 and spaced at intervals determined by maximum beam dimension and desired beam direction considerations are a plurality of energy concentration and/or redirection means such a focuser-redirector 13.

Element 13 receives an energy beam traveling as rays 14 in a first rectilinear direction from source 11 and refocuses and, if desired, redirects the beam as rays 15 also traveling in a rectilinear direction. Typically in millimeter and optical frequency communication systems, the propagating energy is confined to a transmission medium which is shielded from external effects such as electrical interference and, particularly for optical wavelength energy, from the atmosphere itself which can introduce significant beam attenuation. In FIG. 1, the transmission medium is illustrated as hollow cylindrical tubes, or "light pipes" 16, 17. Tubes 16, 17 advantageously have a diameter sufficiently greater than the light beams enclosed thereby to have negligible influence, other than shielding, upon the propagating light beam. These tubes can be evacuated, or they can be filled with an inert gas, such as argon, maintained at a pressure at which scattering is unimportant. Furthermore, the tubular transmission medium can be buried underground together with associated supporting means 18 or if desired, it can be supported above ground level. Supporting platforms 18 are substantially vibration free and are decoupled from their surroundings in the manner of seismographs and delicate galvanometers.

Typically, focuser-redirectors 13 are spaced apart distances comparable to $(2a)^2/\lambda$ where $2a$ is the conical lens aperature and $\lambda$ is the free space wavelength of the associated energy. Although only a single focuser is illustrated in FIG. 1, tube 17 is broken to indicate the omission of a plurality of similar redirectors spaced apart typical intervals along the many miles of the illustrated system. Thus signal information bearing energy originating at station 11 is ultimately received at station 12, having been refocused perhaps hundreds of times.

In accordance with the present invention, focuser-redirector 13 comprises a conical lens having an internal surface in the shape of a right circular cone and an external tapered conical surface.

Figure 2:
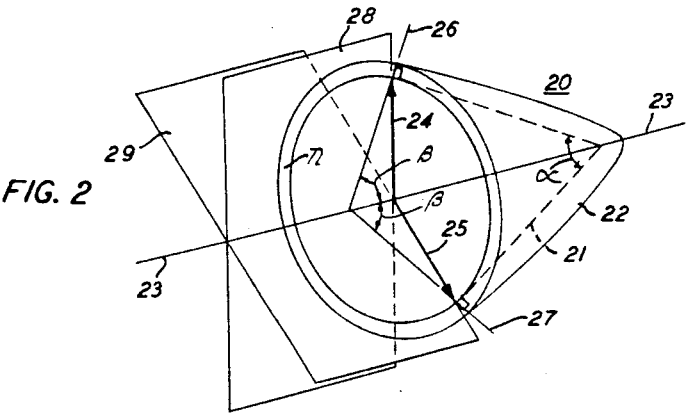
FIG. 2 is a perspective view of a conical lens in accordance with the invention.

The lens configuration involved can be more completely understood from reference to FIG. 2, which illustrates a conical lens 20 in accordance with the invention comprising a dielectric material of refractive index $n$. Lens 20 is described by an internal right conical surface 21 of cone angle $\alpha$ and an external tapered right conical surface 22 to be more fully defined in a later portion of the specification.

Conical surfaces 21, 22 are coaxial with respect to axis 23. Lens 20 can comprise a high quality optical glass of which Corning No. 7056 and Bausch & Lomb No. BSC-51 are typical examples, or, at millimeter wave frequencies, can comprise irradiated high density polyethylene, such as Marlex. The internal cone angle $\alpha$ equals $2(90-\beta)$ degrees where $\beta$ is the Brewster angle defined as $\tan^{-1} n$. The selection of $\alpha$ in accordance with Brewster angle considerations is related to the performance of lens 20 as a low loss focusing element for energy in the $TM_{on}$ wave mode. As is well known, the $TM_{on}$ wave mode family is characterized by electric vectors which, in transverse cross section, extend essentially radially from the mode center and magnetic vectors which, in transverse cross section, form closed circular loops. In FIG. 2, arrows 24, and 25 represent the electric field vectors of a portion of a $TM_{01}$ wave incident on lens 20 along a propagation path coincident with axis 23. At the points of incidence of vectors 24, 25 upon surface 21, planes of incidence 28, 29 which defined as those planes determined by the normal to the lens surface at the point of incidence and the direction of energy flow, are described. Thus internal surface normal 26 and axis 23 define the plane of incidence 28 for a ray with an electric field portion represented by vector 24 and internal surface normal 27 and axis 23 define the plane of incidence 29 for a ray with an electric field portion represented by vector 25. With vectors 24, 25 lying in their respective planes of incidence for the internal surface 21, the angle between the propagation direction of the incident energy and the surface normals is $\beta$, the associated Brewster angle. Since it is known that waves incident upon a dielectric interface at the Brewster angle, with the electric vectors of the incident waves lying in the plane of incidence, will experience zero reflection, it is seen that the described $TM_{01}$ wave incident upon conical surface 21 at the Brewster angle will be refracted thereby substantially without reflection. By the same token wave modes having vector configurations different from those of the $TM_{on}$ family will experience surface reflection since these modes do not everywhere impinge at the Brewster angle.

In order that lens 20 provide beam focusing, external surface 22 is tapered in accordance with the invention. The tapered construction, together with its particular focusing properties, can be more clearly understood by reference to FIG. 3, which is a longitudinal cross sectional view of lens 20 of FIG. 2.

Figure 3:
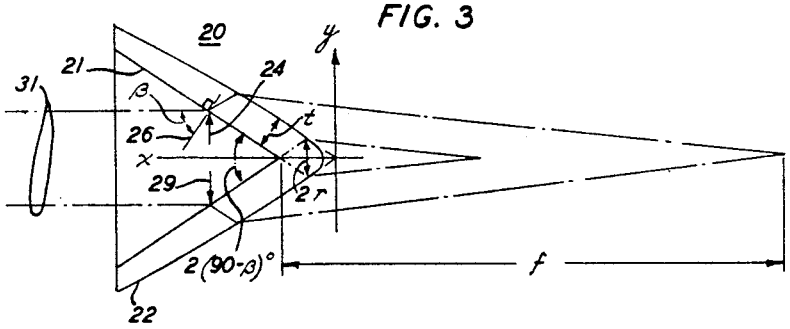
FIG. 3 is a cross sectional view of a conical lens illuminated by an energy beam.

In FIG. 3, beam 31 of wave energy in a $TM_{on}$ mode is incident upon conical surface 21 at the Brewster angle $\beta$, defined between the propagation direction of the beam and surface normal 26. The electric field is represented in cross section by radial vectors 24, 29. If internal surface 21 and external surface 22 were parallel, the energy incident on surface 21 would be refracted thereby and again refracted at surface 20 to proceed parallel to the incoming beam 31. However, since the incoming wave is, due to diffraction effects, assumed to have the maximum desired physical spread at the lens it is necessary to introduce beam convergence, or focusing to reduce the beam dimension at points beyond the lens. To this end, external surface 22 is tapered to provide typical focal lengths of the order of $(2a)^2/\lambda$. Mathematically, taking into consideration the angles of incidence and refraction, the focal length $f$, and the index of refraction $n$ of the lens material, the external lens surface 22 can be described, for a typical axial cross section in an $x, y$ co-ordinate system with origin at the apex of the outer surface, as $$y = \frac{x}{n}\left[1 + \frac{1+n^2}{2n^2(1-n^2)} \frac{x}{f}\right]$$

Such a second order curve in $x$ describes the curvature of surface 22 for any longitudinal section of lens 20, which surface, of course is a surface of revolution of the described curve about the $x$ axis.

Lenses in accordance with the invention introduce certain transmission losses due to mode conversion caused by the lens apex and by the fact that the external lens surface deviates from the condition of precise Brewster angle incidence. The transfer function for a $TM_{01}$ energy beam such as beam 31 incident upon lens 20 can be shown to be $$T = 1 + \frac{x_0^2}{4}\left[1 - 2\ln 2(1 + \frac{1}{x_0})\right]$$

where:

$$x_0 = \frac{2\pi r^2}{\lambda R}$$

$$r = \frac{2t}{n} \frac{n^2 - 1}{\sqrt{n^2 + 1}}$$

$R$ is the lens separation, and
$t$ is the maximum lens thickness measured normally to the surfaces.

For typical lens parameters of $t = 1$ mm., $\lambda = 10^{-6}$ m., and $R = 100$ m.

$T = 0.99964$, indicating that transmitted $TM_{01}$ mode power is 0.0031 decibel below the incident $TM_{01}$ mode power.

Figure 4:
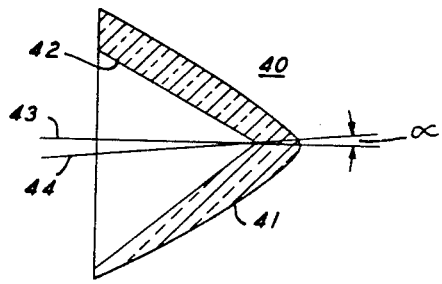
FIG. 4 is a cross sectional view of a conical lens in which beam redirection is accomplished.

In millimeter and optical frequency communication systems, it is often necessary to change the direction of propagation of the energy beam. Such redirection of $TM_{01}$ energy beams can be accomplished with conical lenses in accordance with the invention. FIG. 4 illustrates, in longitudinal cross section, a conical lens 40 having both focusing and redirecting properties. Lens 40 has an external conical surface of revolution 41 tapered in accordance with the relationship set out hereinbefore with respect to FIG. 3 and an internal surface 42 in the shape of a right circular cone. The axis of revolution of external surface 41 is indicated as line 43, and the axis of revolution of internal surface 42, by line 44. Instead of being coincident, however, as was the case for the focusing lens of FIGS. 2 and 3, axes 43, 44 are related by a finite angle $\alpha$ as shown in FIG. 4, the axes 43, 44 both lying in the plane of the drawing. However, it is evident that the interior and exterior conical surfaces can be related in numerous other variations producing axes lying in other planes. By thus tilting the internal and external lens surfaces with respect to each other, the focal point of the lens will be shifted from its location on the coincident axes of FIG. 3, and will appear at a location between the axes 43, 44 of FIG. 4. When a conical lens is used simultaneously for beam redirection and beam focusing, the incident beam preferably impinges upon the lens along axis 44, thereby preserving the Brewster angle condition of incidence. If the axis of the impinging beam coincides with axis 43, the axis of the emerging beam makes an angle $(n^2-1)\alpha$ with axis 43, $n$ being the refractive index of the lens material. At surface 42, of course, the incident energy departs from the Brewster angle condition due, in addition to the surface taper, to the tilt between the internal and external cone axes. However, since the reflection losses increase only slightly for small deviations from the Brewster angle, associated losses are only slightly increased.

Figure 5:
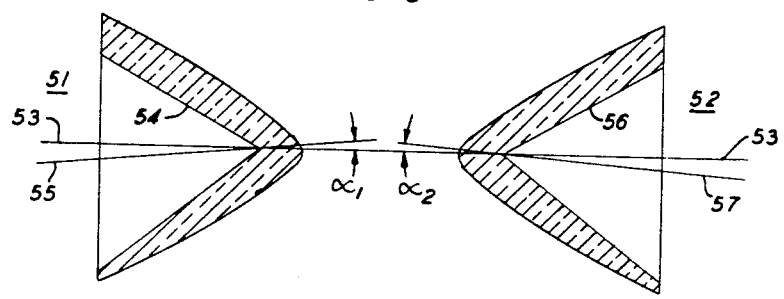
FIG. 5 is a cross sectional view of a conical lens redirector.
Figure 6:
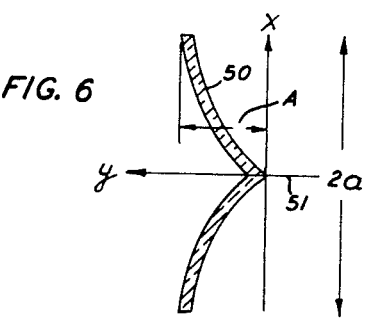
FIG. 6 illustrates an alternative cone-like lens for TM$_{on}$ mode wave energy.

FIG. 5 is a plan view of a versatile redirector using two conical lenses 51, 52 of the type shown in FIG. 4. For purposes of explanation, it will be assumed that the internal and external surfaces of each of lenses 51, 52 are related by identical angles $\alpha$ and that FIG. 5 illustrates the lenses in the cross sectional arrangement indicating maximum angular deviation between the axes. Lenses 51, 52 are disposed along a common axis 53 and are oriented with apexes adjacent. Interior surface 54 of lens 51 has an associated axis 55 and interior surface 56 of lens 52 has associated axis 57, related to axis 53 by angles $\alpha_1$, $\alpha_2$ respectively. As illustrated in FIG. 5, an energy beam incident upon lens 51 from the left along axis 53 will be deflected by lens 51 an amount $\alpha = (n^2-1)\alpha_1$ and will impinge upon the apex of conical lens 52 thus deflected. Lens 52 will add an additional deflection $\alpha' = (n^2-1)\alpha_2$ and the beam will therefore emerge from the right side of lens 52 with a total deflection, or angle of redirection, of $(\alpha+\alpha')$ or, when $\alpha_1 = \alpha_2$, of 2. By rotating one of lenses 51, 52 about axis 53, the angle of redirection can be varied between $2\alpha$ and zero. Thus for example, a 180 degree revolution of lens 52 about axis 53 will produce a zero net beam deflection of a beam initially incident upon lens 51 along axis 53. Similarly, rotations less than 180 degrees will result in beam redirection greater than zero. In this manner, conical lenses can be advantageously employed as redirectors for optical communication systems.

In some situations, it may not be desirable for economic reasons to meet the tolerances involved in producing the tapered curvature conical lenses hereinabove described. In such situations, a lens of constant thickness can be used for $TM_{on}$ focusing purposes, although at some sacrifice in effectiveness. Such a lens is illustrated in FIG. 5, and comprises a lens 50 having a cross section described by the curvature of one half of the S-lens disclosed and described in the copending application of R. Kompfner, Ser. No. 161,591, filed Dec. 22, 1961. As set out at length in said copending application, the S-lens is a dielectric sheet having parallel surfaces warped with an essentially sinusoidal surface curvature. The complete S-lens incorporates a one-half period sinusoidal variation and, accordingly, the cross section of a conical S-lens incorporates a one-quarter period sinusoidal surface variation. By revolving such a quarter period sinusoid about axis 51 a lens having low loss $TM_{on}$ mode focusing properties is realized. In FIG. 5, the surface variation, in the $x$, $y$ coordinate system indicated, is $y = A \sin \pi x/a$ where $2a$ is the aperture of the lens and $A$ is chosen such that close to $x=0$ the incident beam impinges at the Brewster angle. The sinusoidal variation extends from $x=0$ to $x=\pm a/2$.

In all cases, it is understood that the above described embodiments are illustrative of the principles of the present invention. Numerous and varied other embodiments could be devised in accordance with these principles by those skilled in the art without departing from the spirit and scope of the invention.

What is claimed is:

1. Means for focusing electromagnetic wave energy in modes of the circular magnetic family comprising
   a low loss dielectric lens having first and second conical surfaces,
   said first surface being a right circular cone having a first axis of revolution and having an apex angle equal to $2(90-\beta)$ degrees where $\beta$ is the Brewster angle of incidence of energy propagating parallel to said axis,
   said second surface providing focusing of said energy when incident from said first surface and having a second order tapered configuration in an $x$, $y$ co-ordinate system with origin at the apex of the second surface substantially described by $$y = \frac{x}{n}\left[1 + \frac{1+n^2}{2n^2(1-n^2)}\frac{x}{f}\right]$$

where $n$ is the index of refraction of the lens material and $f$ is the focal length of the lens, said second surface having a second axis of revolution which coincides with the $x$ axis of said $x$, $y$ co-ordinate system,
   the apex of each of said first and second surfaces of revolution pointing in the same direction with respect to incident wave energy.

2. The focusing means according to claim 1 in which said first and second axes are coincident.

3. The focusing means according to claim 1 in which said first and second axes intersect at a finite non-zero angle.

4. In combination with the focusing means according to claim 3,
   a second low loss dielectric lens disposed along said second axis and having a first conical surface and a second tapered conical surface similarly disposed and configured with third and fourth axes of revolution respectively,
   said third and fourth axes intersecting at a finite non-zero angle.

5. The combination according to claim 4 in which said second and said fourth axes are coincident.

6. In combination with the focusing means according to claim 1, means for illuminating said first surface with wave energy in a $TM_{on}$ mode propagating parallel to said first axis.

7. A redirector for electromagnetic wave energy in the millimeter and optical frequency range comprising
   a first dielectric lens having first and second conical surfaces of revolution with apexes pointing in the same direction with respect to incident wave energy,
   said second surface providing focusing of said energy when incident from said first surface and having a second order tapered configuration in an $x$, $y$ co-ordinate system with origin at the apex of the second surface substantially described by $$y = \frac{x}{n}\left[1 + \frac{1+n^2}{2n^2(1-n^2)}\frac{x}{f}\right]$$

where $n$ is the index of refraction of the lens material and $f$ is the focal length of said lens, said second surface having a first axis of revolution which coincides with the $x$ axis of said $x$, $y$ co-ordinate system,
   said first surface having a right circular cone configuration and having a second axis of revolution different from and intersecting said first axis, and a second dielectric lens having third and fourth conical surfaces of revolution with apexes pointing in the same direction with respect to incident wave energy, said fourth surface having a second order tapered configuration substantially identical to said second surface and having an axis of revolution coincident with said first axis, said third surface having a right circular cone configuration and having a third axis of revolution different from and intersecting said first axis.

8. The redirector according to claim 7 in which said first and second lens are disposed along said first axis with the apexes of said second and said fourth surfaces of revolution adjacent.

References Cited by the Examiner

UNITED STATES PATENTS

| 2,759,393 | 8/1956 | McLeod | 88—57 X |
| 2,821,107 | 1/1958 | Bouwers | 88—57 |
| 3,144,617 | 8/1964 | Kogelnik et al. | 331—94.5 |
| 3,224,331 | 12/1965 | Kompfner | 88—57 |

DAVID H. RUBIN, *Primary Examiner.*

JOHN K. CORBIN, *Examiner.*

J. H. PEDERSEN, *Assistant Examiner.*